United States Patent
Huang et al.

(10) Patent No.: US 6,535,955 B1
(45) Date of Patent: Mar. 18, 2003

(54) REDUNDANT ARRAY OF INEXPENSIVE DISKS CONTROLLER

(75) Inventors: Su-Syan Huang, Hsinchu (TW); Shih-Chang Cheng, Hsinchu (TW)

(73) Assignee: Accusys, Inc. (TW)

( * ) Notice: Subject to any disclaimer, the term of this patent is extended or adjusted under 35 U.S.C. 154(b) by 271 days.

(21) Appl. No.: 09/628,518

(22) Filed: Jul. 31, 2000

(30) Foreign Application Priority Data

Apr. 26, 2000 (TW) .................................. 89206834 U

(51) Int. Cl.[7] .............................................. G06F 12/00
(52) U.S. Cl. ............................................ 711/114; 711/5
(58) Field of Search ........................ 711/114, 5; 714/766, 714/769; 703/24; 365/189.02

(56) References Cited

U.S. PATENT DOCUMENTS

| | | | | |
|---|---|---|---|---|
| 5,291,584 A | * | 3/1994 | Challa et al. | 703/24 |
| 5,343,426 A | * | 8/1994 | Cassidy et al. | 365/189.02 |
| 5,410,680 A | * | 4/1995 | Challa et al. | 703/24 |
| 5,459,742 A | * | 10/1995 | Cassidy et al. | 714/769 |
| 5,555,402 A | * | 9/1996 | Tuma et al. | 703/24 |
| 5,787,493 A | * | 7/1998 | Niijima et al. | 711/204 |
| 5,884,067 A | * | 3/1999 | Storm et al. | 345/533 |
| 5,889,795 A | * | 3/1999 | Niijima et al. | 714/766 |
| 6,188,571 B1 | * | 2/2001 | Roganti et al. | 361/685 |
| 6,215,687 B1 | * | 4/2001 | Sugano et al. | 365/52 |

OTHER PUBLICATIONS

Lee et al., "An 18Mb Serial Flash EEPROM for Solid–State Disk Applications," IEEE, pp 59–60, 1994.*
Cemea et al., "A 34Mb 3.3V Serial Flash EEPROM for Solid–State Disk Applications," IEEE, pp 126–128, 1995.*

* cited by examiner

Primary Examiner—Matthew Kim
Assistant Examiner—Stephen Elmore
(74) Attorney, Agent, or Firm—Alston & Bird LLP

(57) ABSTRACT

A disk controller, and more particularly, a redundant arrays of inexpensive disks (RAID) controller, is disclosed. The RAID controller includes: a redundant arrays of inexpensive disks (RAID) controller board, a memory module slot mounted on the controller board for inserting therein a 144-pin small outline dual inline memory module (SODIMM), an I/O processor mounted on the controller board and electrically connected with the memory module slot for transmitting a data clock signal and an error-prevention data, and a random access memory integrated chip (RAM IC) mounted on the controller board and electrically connected with the I/O processor for storing the error-prevention data.

13 Claims, 3 Drawing Sheets

REDUNDANT ARRAY OF INEXPENSIVE DISKS CONTROLLER

FIELD OF THE INVENTION

The present invention relates to a disk controller. In particular, it relates to a redundant array of inexpensive disks (RAID) controller.

BACKGROUND OF THE INVENTION

Dynamic random access memory (DRAM) nowadays has become a common memory element in a digital data processing device. As usual, the DRAM is electrically contacted in the slots on a circuit board in the form of memory module hardware implementation. Please refer to FIG. 1(a) and FIG. 1(b). FIG. 1(a) is the exterior view of a 168-pin memory module (dual inline memory module, DIMM), which is mostly employed in a desktop computer. FIG. 1(b) is the exterior view of a 144-pin memory module (small outline dual inline memory module, SODIMM), which is typically employed in a laptop computer. For the purpose of rendering 144-pin SODIMM feasible in a laptop computer, the length of a SODIMM (67.6 mm) is far smaller than that of a 168-pin DIMM (133.35 mm), and therefore the pin number of the SODIMM is less than that of the DIMM by 24 (168−144=24).

In order to ensure the accuracy while the memory module is transmitting data, miscellaneous error-prevention means are developed. In particular, error correction code (ECC) and parity check are the most common error-prevention means. Owing to the limitation of the functions that the memory module can support, currently the error-prevention function for correcting the memory module errors, e.g. ECC or parity check, is supported on a 168-pin DIMM only. With respect to the 144-pin SODIMM, the error-prevention function is still unsupported thus far.

Please refer to FIG. 2 which shows a conventional redundant arrays of inexpensive disks (RAID) controller board with a 168-pin DIMM slot mounted thereon. The memory module slot 21 is used to insert therein a 168-pin DIMM 22 (the DIMM 22 has multiple synchronous dynamic random access memory 221, . . . , 22n), and the I/O processor 23 transmits a data clock signal through multiple connection lines 24 connecting between the I/O processor 23 and the memory module slot 21. Each one of the connection 24 lines has the same length of X (where X should be kept as small as possible). The feedback data clock line 25 has a length of X+a (where a varies with the category and type of the I/O processor 23, e.g. if the I/O processor is an Intel i960RN processor, a will be 4 inches) and be connected with a microcapacitor in parallel for tuning the timing clock.

The dimension of aforesaid RAID controller board is usually confined to that of the chassis of a standard 5.25 inches hard disk or that of a bus interface card for a standard personal computer, and therefore the 168-pin DIMM slot with the length of 133.35 mm will make the circuit board very crowded, which causes the disturbance and limitation on the circuit layout. As a result, the dimension of the circuit board can not be reduced further. Consequently, selecting the 144-pin SODIMM shown in FIG. 1(b) as the memory module on a RAID controller board is a better choice because the length of the memory module slot can be greatly reduced below 7 cm and the dimension of the circuit board can be reduced further. Unfortunately, the SODIMM does not support the error correction function, and it will severely affect the performance of a RAID controller which requires a powerful error detection and compatibility function.

There arose a need for the applicant to develop a disk controller to dispose of the shortcomings encountered in the prior art.

SUMMARY OF THE INVENTION

An object of the present invention is to provide a disk controller, which not only has a reduced dimension but can support the error-prevention function.

According to the present invention, the disk controller of the present invention includes: a circuit board, a memory module slot mounted on the circuit board for inserting therein a memory module, an I/O processor mounted on the circuit board and electrically connected with the memory module slot for transmitting a data clock signal and an error-prevention data, and a random access memory integrated chip (RAM IC) mounted on the circuit board and electrically connected with the I/O processor for storing the error-prevention data.

Preferably, the disk controller is a redundant arrays of inexpensive disks (RAID) controller, and the memory module is a 144-pin small outline dual inline memory module (SODIMM).

Preferably, the circuit board has a dimension smaller than or equal to the dimension of chassis of a standard hard disk drive.

Preferably, the random access memory integrated chip is a synchronous dynamic random access memory integrated chip (SDRAM IC).

Alternatively, the error-prevention data is an error correction code (ECC) or a parity check.

Preferably, the length of the connection line connecting between the I/O processor and the RAM IC is longer than that of the connection line connecting between the I/O processor and the memory module slot by an additional length.

In accordance with the present invention, the I/O processor is an Intel i960RN processor, and the aforementioned additional length will be 3.4 inches.

In accordance with the present invention, the disk controller further includes a feedback data clock line electrically connected with the I/O processor in parallel for performing feedback to the I/O processor in order to tune the timing clock of the data clock signal.

In accordance with the present invention, the feedback data clock line and the connection line connecting between the I/O processor and the RAM IC are respectively connected with microcapacitors in parallel.

According to another aspect of the present invention, the redundant arrays of inexpensive disks (RAID) controller includes: a redundant arrays of inexpensive disks (RAID) controller board, a memory module slot mounted on said controller board for inserting therein a 144-pin small outline dual inline memory module (SODIMM), an I/O processor mounted on said controller board and electrically connected with said memory module slot for transmitting a data clock signal and an error-prevention data, and a random access memory integrated chip (RAM IC) mounted on said controller board and electrically connected with said I/O processor for storing said error-prevention data, wherein the length of the connection line connecting between said I/O processor and said RAM IC is longer than that of the connection line connecting between said I/O processor and said memory module slot by an additional length.

Now the foregoing and other features and advantages of the present invention will be more clearly understood through the following descriptions with reference to the accompanying drawings, in which:

DETAILED DESCRIPTION OF THE PREFERRED EMBODIMENT

Figure 1A:
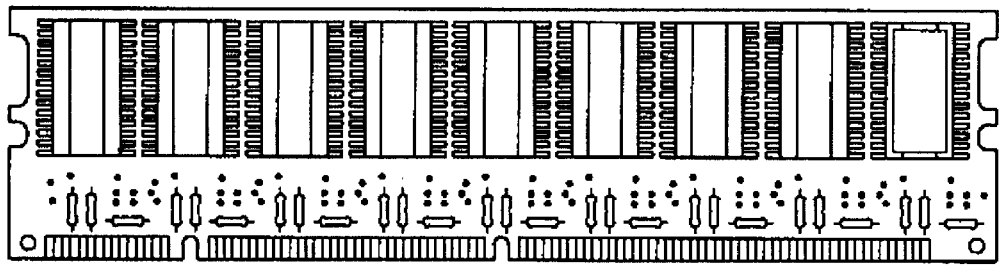
FIG. 1(a) is an exterior view of a 168-pin dual inline memory module (DIMM)
Figure 1B:
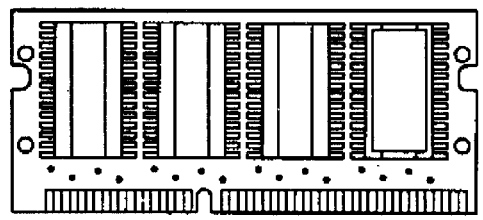
FIG. 1(b) an exterior view of a 144-pin small outline dual inline memory module (SODIMM)
Figure 2:
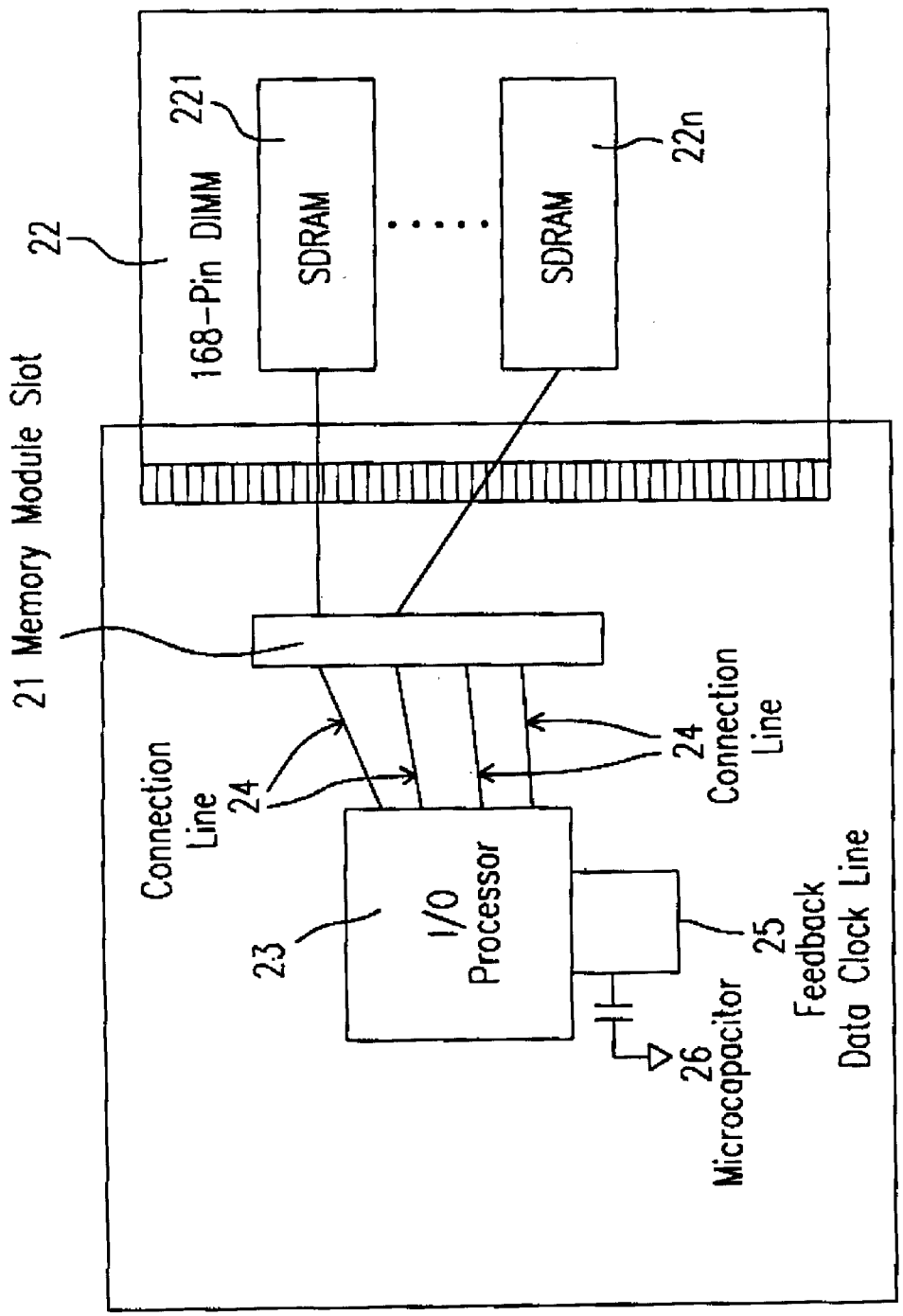
FIG. 2 is a circuit block diagram showing a conventional RAID controller board.
Figure 3:
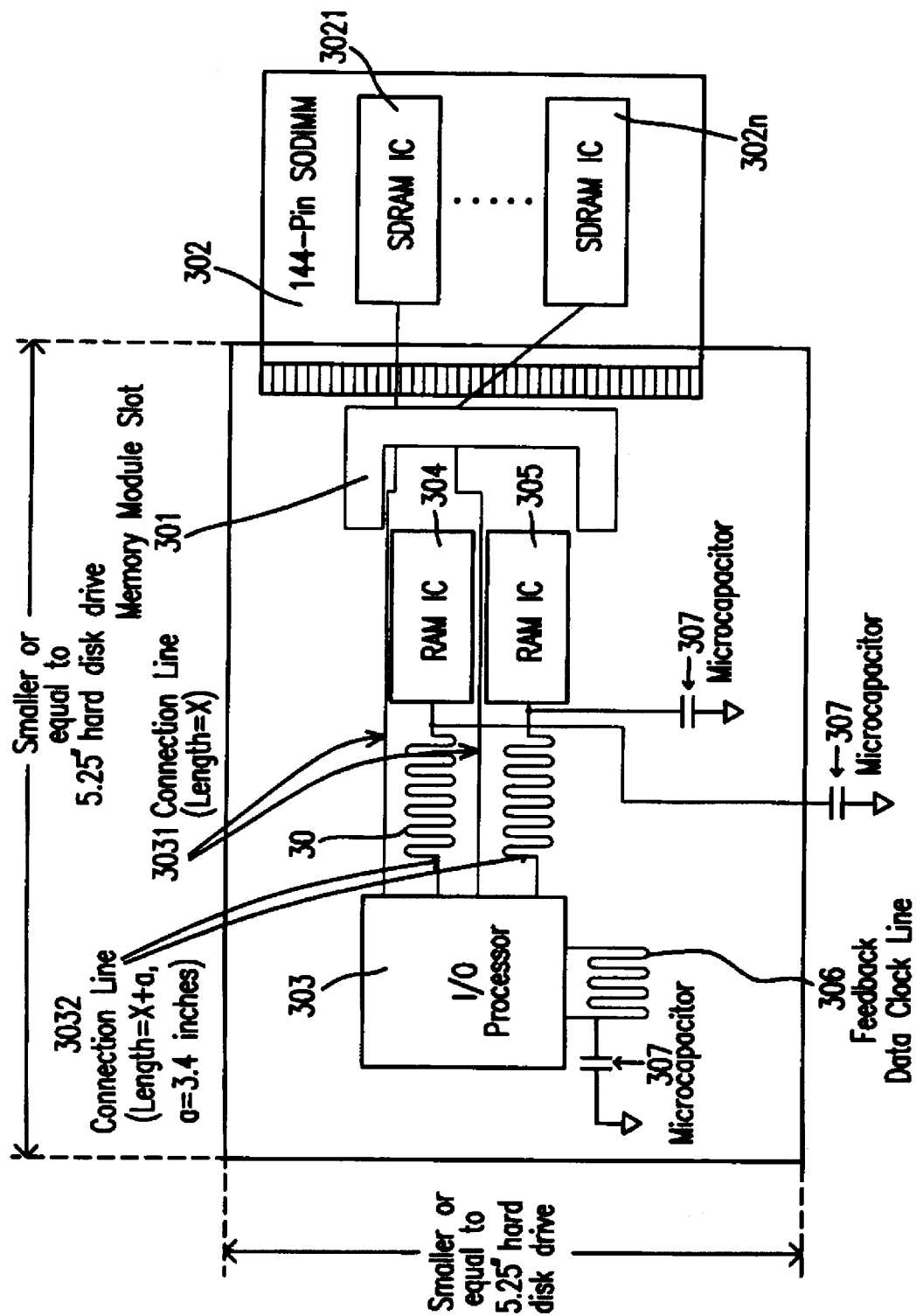
FIG. 3 is a circuit block diagram showing a RAID controller board of the present invention.

Referring to FIG. 3, an illustrative embodiment of a RAID controller board 30 has a dimension smaller than or equal to the dimension of chassis of a standard hard disk drive. As for the memory module slot 301 on the circuit board 30, it is used to insert therein a 144-pin SODIMM 302, where the 144-pin SODIMM 302 comprises multiple synchronous dynamic random access memory (SDRAM) ICs 3021, . . . , 302n. In addition, the I/O processor 303 in this embodiment is implemented with an Intel i960RN processor. While the I/O processor 303 is reading/writing data with the SODIMM 302, a data clock signal and an error-prevention data (which may be a parity check information, but is an error correction code in this embodiment) are transmitted to the SODIMM 302. However, the 144-pin SODIMM 302 is unable to support the error-prevention function, and therefore an additional RAM IC 304 or 305 is mounted on the circuit board 30 (where the RAM IC is a synchronous dynamic random access memory IC in this embodiment) for storing the error correction code and further supporting the error-prevention function.

With the technology development that the frequency of the data clock signal is increased, a circuit layout standard must be obeyed. That is, assuming that the connection line 3031 connecting between the I/O processor 303 and the memory module slot 301 has a length of X, the connection line 3032 connecting between the I/O processor 303 and the RAM IC 304 or 305 must have a length of X+a. Moreover, the feedback data clock line 306 connecting between the I/O processor 303 and the microcapactior 307 also has a length of X+a.

Concerning the value of X and a, both of them varies with the category and type of the I/O processor. For example, if the I/O processor 303 is an Intel i960RN processor, "X" should be kept as small as possible, and "a" will be 3.4 inches. Both of the connection line 3032 and the feedback data clock line 306 are respectively connected with a microcapacitor (about 10–20 picofarads) in parallel. The data read/write timing clock can be tuned by changing the capacitance of the microcapacitor.

In summary, the memory module of the RAID controller board of the present invention is implemented with a 144-pin SODIMM and hence the dimension of the board can be further reduced. Besides, the additional RAM IC 304 or 305 can support the error-prevention function such as ECC, and it will not affect the performance of a RAID controller which requires a powerful error detection and compatibility function.

Those of skill in the art will recognize that these and other modifications can be made within the spirit and scope of the invention as defined in the appended claims.

We claim:

1. A disk controller comprising:
   a circuit board;
   a memory module slot mounted on said circuit board for inserting therein a memory module;
   an I/O processor mounted on said circuit board and electrically connected with said memory module slot for transmitting a data clock signal and an error-prevention data; and
   a random access memory integrated chip (RAM IC) mounted on said circuit board and electrically connected with said I/O processor for storing said error-prevention data.

2. The disk controller of claim 1 wherein said disk controller is a redundant array of inexpensive disks (RAID) controller.

3. The disk controller of claim 1 wherein said circuit board has a dimension smaller than or equal to the dimension of a standard 5.25" hard disk drive.

4. The disk controller of claim 1 wherein said memory module is a 144-pin small outline dual inline memory module (SODIMM).

5. The disk controller of claim 1 wherein said random access memory integrated chip is a synchronous dynamic random access memory integrated chip (SDRAM IC).

6. The disk controller of claim 1 wherein said error-prevention data is an error correction code (ECC).

7. The disk controller of claim 1 wherein said error-prevention data are data for a parity check.

8. The disk controller of claim 1 wherein the length of the connection line connecting between said I/O processor and said RAM IC is longer than that of the connection line connecting between said I/O processor and said memory module slot by an additional length.

9. The disk controller of claim 8 wherein said I/O processor is an Intel i960RN processor.

10. The disk controller of claim 9 wherein said additional length is 3.4 inches.

11. The disk controller of claim 1 further comprising a feedback data clock line electrically connected with said I/O processor in parallel for performing feedback to said I/O processor in order to tune the timing clock of said data clock signal.

12. The disk controller of claim 11 wherein said feedback data clock line and said connection line connecting between said I/O processor and said RAM IC are respectively connected with microcapacitors in parallel.

13. A redundant arrays of inexpensive disks (RAID) controller comprising:
   a redundant arrays of inexpensive disks (RAID) controller board;
   a memory module slot mounted on said controller board for inserting therein a 144-pin small outline dual inline memory module (SODIMM);
   an I/O processor mounted on said controller board and electrically connected with said memory module slot for transmitting a data clock signal and an error-prevention data; and
   a random access memory integrated chip (RAM IC) mounted on said controller board and electrically connected with said I/O processor for storing said error-prevention data;
   wherein the length of the connection line connecting between said I/O processor and said RAM IC is longer than that of the connection line connecting between said I/O processor and said memory module slot by an additional length.

* * * * *